(12) United States Patent
Hahn

(10) Patent No.: US 6,565,049 B2
(45) Date of Patent: May 20, 2003

(54) LINE HOLDER

(75) Inventor: Ernst Ludwig Hahn, Rabenau (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/039,883

(22) Filed: Jan. 3, 2002

(65) Prior Publication Data

US 2002/0088095 A1 Jul. 11, 2002

(30) Foreign Application Priority Data

Jan. 10, 2001 (DE) .......................... 101 00 831

(51) Int. Cl.$^7$ .................................. F16L 3/22
(52) U.S. Cl. .................. 248/68.1; 248/74.1; 248/74.2
(58) Field of Search .............. 248/68.1, 74.1, 248/74.2, 65

(56) References Cited

U.S. PATENT DOCUMENTS

| | | | | |
|---|---|---|---|---|
| 4,131,257 A | * | 12/1978 | Sterling | ................ 24/335 |
| 4,437,633 A | * | 3/1984 | Andre | ................ 248/68.1 |
| 4,961,554 A | * | 10/1990 | Smowton | ................ 248/68.1 |
| 5,016,336 A | * | 5/1991 | Barnett et al. | ................ 248/74.2 |
| 5,301,917 A | * | 4/1994 | Dyer | ................ 248/68.1 |
| 5,626,316 A | * | 5/1997 | Smigel et al. | ................ 248/68.1 |
| 5,653,411 A | * | 8/1997 | Picco et al. | ................ 24/339 |
| 5,820,048 A | * | 10/1998 | Shereyk et al. | ................ 24/487 |

* cited by examiner

Primary Examiner—Anita King
Assistant Examiner—Amy J. Sterling
(74) Attorney, Agent, or Firm—Edward D. Murphy

(57) ABSTRACT

The present invention relates to a line holder (1) for vibration-damped retention of lines in a motor vehicle above at least two planes $E_u$ and $E_o$ located one above the other. A sealing clip 3 of the line holder 1 which can be pivoted by a support element 2 allows clamping of the received lines by means of meshing tongues 8, 9 moulded thereon.

7 Claims, 4 Drawing Sheets

LINE HOLDER

BACKGROUND OF THE INVENTION

The present invention relates to a line holder for vibration-damped retention of various lines, such as fluid lines and/or cables in motor vehicles.

Today's motor vehicles have a plurality of lines and/or cables. These include fluid lines for the fuel, for the brake fluid or for the hydraulics of the power-assisted steering. Also, there are several electrical lines in a motor vehicle.

These lines are conventionally laid by means of securing elements on parts of the car body, in particular on car body metal sheets and base parts, wherein, on the one hand, the securing element can be secured to threaded bolts or the like connected to the car body and, on the other hand, has at least one receiving region for a line. Of course, a detachment of the line during operation of the motor vehicle should always be prevented and the line should be held or secured in such a way that vibrations are fundamentally ruled out.

One type of prior art uses line holders with a plurality of receiving regions on either side there of and has a threaded bolt connected to the car body. Such a prior art device has a plurality of receiving regions arranged parallel to one another for receiving a line of a set diameter, respectively.

Another type of prior art line holder is used, in particular, for retaining tubes in the motor vehicle. It may have two receiving regions arranged on a support plate so as to be offset from one another for receiving a respective tube with a set diameter are provided, which receiving regions can each be covered by a meshing sealing clip if the tube is inserted such that ultimately vibration-damped retention is achieved.

In the noted prior art devices, the receiving regions are dimensioned in such a way that the lines may be introduced easily from above into the receiving regions and may be pressed down into the vibration-damped retaining position, various bearing elements and positioning elements exerting an appropriate pressure force onto the introduced tubes, so vibrations issuing from the vehicle operation, on the one hand, and from the throughflow of the respective control fluids, on the other hand, are damped.

Nowadays, a plurality of different lines for the most varied of units are to be laid in a modern motor vehicle. It is desirable in this case, from a design point of view on the one hand, and for reasons of ease of assembly on the other hand, to guide as many lines as possible within one loom of lines. Of course the plurality of different lines can be expected to have different diameters.

SUMMARY OF THE PRESENT INVENTION

It is an object of the present invention to provide a line holder for vibration-damped retention of lines with various functions and various diameters which allows ease of assembly during mounting without losses in vibration damping having to be incurred.

It is another object of the present invention to provide a line holder that is simple to make, economical to produce, highly reliable in operation and easy to install.

Therefore, the line holder according to the present invention provides the possibility of receiving lines of all kinds, in particular fluid lines and/or electrical lines, in a motor vehicle, which may have similar or different diameters, wherein they are connectable in one of two planes which are located one above the other.

According to the present invention the vibration-damped retention of the received lines is by means of appropriately designed meshing tongues which are moulded-on in appropriate alignment on the inner side, i.e. on the side of the pivotable sealing clip facing the support element.

For space-saving and vibration-related reasons it is fundamentally advantageous if the line with the larger diameter respectively can be received in the lower plane, i.e. in the plane which faces the car body wall.

According to a development of the invention, the lower plane of at least one receiving region has, for this purpose, a larger receiving diameter than the upper plane of this receiving region located thereabove.

As the respective upper plane of a receiving region must then be designed in such a way that a line with a larger diameter, which is to be received by the respective lower plane, can be passed through this upper plane without difficulty, this upper plane must have at least such a diameter or be elastically expandable such that it is ensured that the line can be passed through without difficulty. It should be taken into account, in this case, that a line with a smaller diameter received in the upper plane cannot be retained exactly in a vibration-damped manner within this plane.

The meshing tongues fix the line received in the upper plane in that when the sealing clip is closed they surround the lines on either side while creating a clamping effect.

For this purpose, in an advantageous development of the invention these meshing tongues which, in the closed state of the line holder, fix the received lines, are spaced in such a way that, with an appropriate smaller dimension, they approximately correspond to the diameter of these lines, so when the sealing clip is closed a corresponding clamping effect is achieved in the upper plane.

According to the invention both the lower and the upper plane of each receiving region have clamping limbs above the received line which are located opposite one another in pairs within the receiving region and are aligned toward the received line with such a length, on the one hand, and with respect to the respective side walls of the receiving region, on the other hand, that they come to rest on the periphery of this received line in such a way that the latter is secured against detachment.

In order to be able to push through the respective lines these clamping limbs, which are preferably integrally connected to the side walls of the receiving region of the support element, are elastically expandable.

In order to receive the lines in the lower plane of the support element the latter has a substantially concave receiving bowl, which is preferably provided with elastically expandable clamping hooks, so an additional clamping effect is achieved.

According to the present invention, the upper plane is provided with retaining limbs which are located opposite one another in pairs within a receiving region and are preferably integrally connected to the side walls of the receiving region. These retaining limbs serve to receive lines with preferably smaller diameters and for this purpose have a shape and alignment complementary to the line to be received. In order to be able to push through the lines for the respective lower planes these retaining limbs, like the clamping limbs, are elastically expandable.

In a preferred embodiment of the invention, the clamping limbs and the retaining limbs of the respective upper plane have apertures into which, in the closed state of the line holder, the meshing tongues of the sealing clip engage and thereby create the desired clamping effect for the lines received in the upper plane.

In a further development of the line holder according to the invention, at least one plane of the receiving region, which is remote from the joint of the sealing clip on the support element, is, in contrast to the other receiving regions, accessible from above, substantially accessible from the side and has at least one clamping limb. This laterally arranged receiving region preferably serves to receive lines with substantially smaller diameters, such as electric lines.

In a further development of the invention, in the closed state of the line holder, the support element and the sealing clip are connected to one another by a catch mechanism which is preferably releasably designed, so accessibility to the laid lines is always ensured.

For reasons of vibration damping on the one hand, and for production cost reasons on the other hand, the line holder is preferably produced from an energy-elastic plastics material, wherein the property of elastic expandability can be provided in the simplest manner by an appropriate reduction in the thickness and appropriately moulded-on alignment of the clamping limbs and retaining limbs.

The line holder according to the present invention always allows complete vibration-damped receiving of lines in a motor vehicle, receiving of lines with different diameters being possible owing to the line holder's appropriate constructive design and vibration damping always being retained in the process. Furthermore, the line holder is characterised in that it allows simple assembly of these lines and, owing to the guidance of a plurality of lines in one line holder, an effective and space-saving arrangement is ensured within the motor vehicle.

BRIEF DESCRIPTION OF THE ACCOMPANYING DRAWINGS

Further features and advantages of the invention emerge from the embodiment illustrated below with the aid of the drawings, in which.

DETAILED DESCRIPTION OF THE PREFERRED EMBODIMENTS

Figure 1:
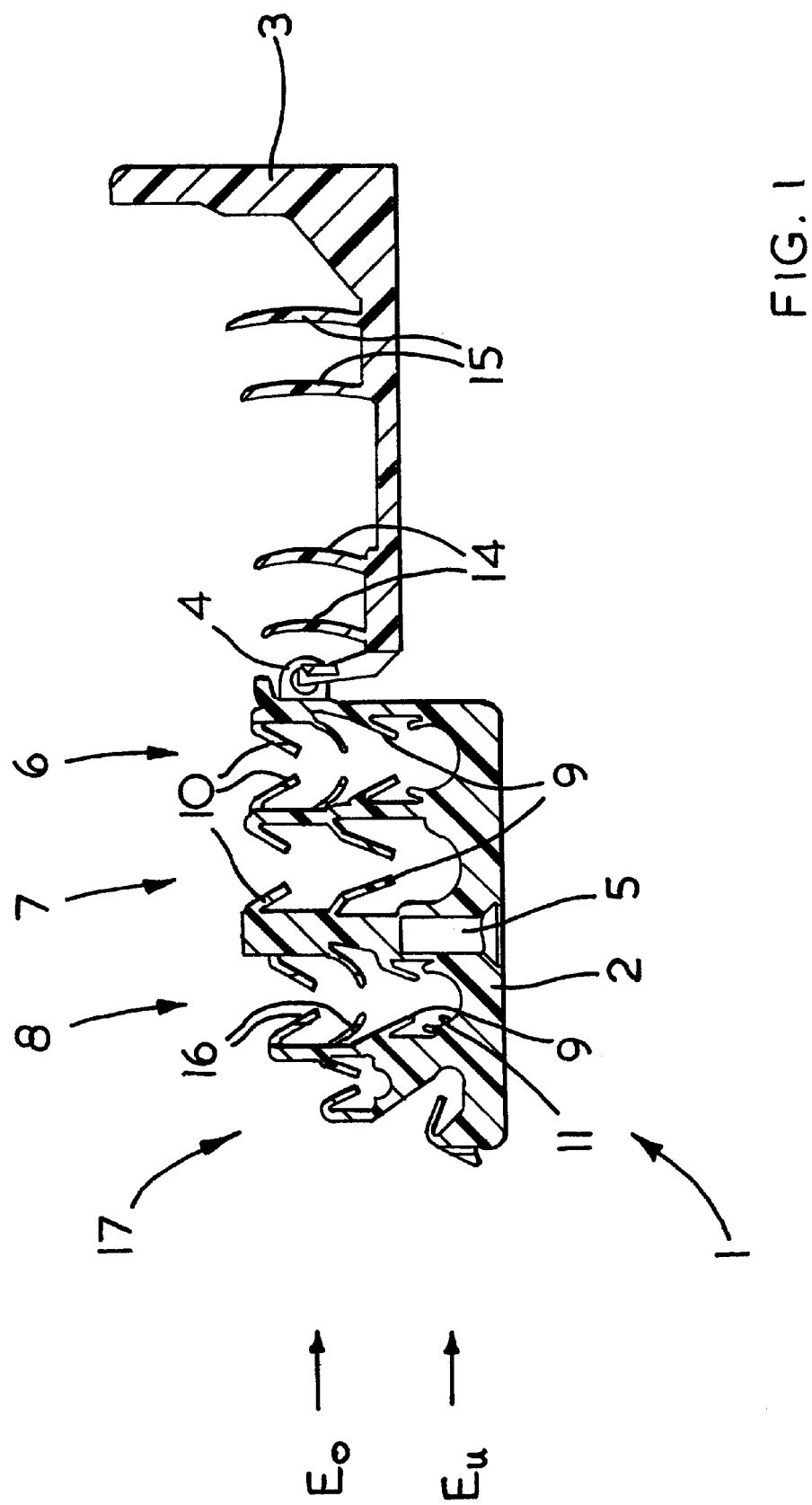
FIG. 1 is a side elevational view, in section, taken along line A—A of FIG. 3, illustrating the line holder of the present invention, without any lines and in the open state.

FIG. 1 shows a line holder 1, which consists of two components, namely a support element 2 and a sealing clip 3. The sealing clip 3 is pivotally mounted on the support element 2 by means of a joint 4, preferably a simple pivot joint, so it can be pivoted by the support element 2.

The support element 2 has, preferably in its central plane, a receiving hole 5 which receives a corresponding threaded bolt or the like (not shown) moulded on a car body wall (not shown), so the support element 2 can be connected to the car body wall in the suitable manner.

The support element 2 has substantially U-shaped receiving regions 6, 7, 8 located parallel to one another. These receiving regions 6, 7, 8 extend over two planes, a lower plane $E_u$ and an upper plane $E_o$ for receiving various lines with various diameters.

At least one receiving region 7 has a larger receiving diameter in its lower plane $E_u$ than in its upper plane $E_o$.

Figure 4:
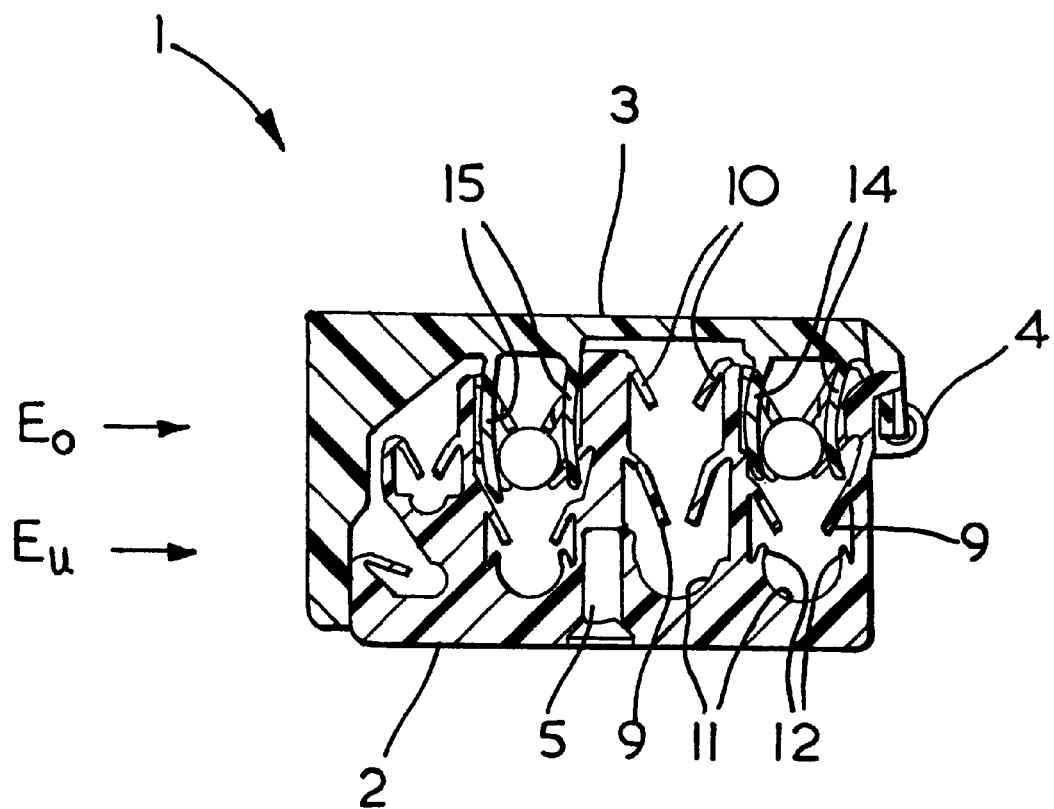
FIG. 4 is a typical cross-sectional view of the line holder of the present invention, similar to FIG. 1, except it is illustrated in the closed position with two lines attached thereto.

The receiving regions 6, 7, 8 have clamping limbs 9 in their lower plane $E_u$ and clamping limbs 10 in their upper plane $E_o$. These clamping limbs 9, 10 are located opposite one another and in pairs respectively within the U-shaped receiving regions 6, 7, 8 and are aligned in such a way that they are directed toward a received line (not shown in FIG. 1) and come to rest thereon, as is shown in FIG. 4, for the upper plane $E_o$. Owing to the appropriate alignment obliquely downward and an appropriate material selection for the support element 2, these clamping limbs 9, 10 are elastically expandable when a line is pushed through them from above in the direction of insertion.

Figure 2:
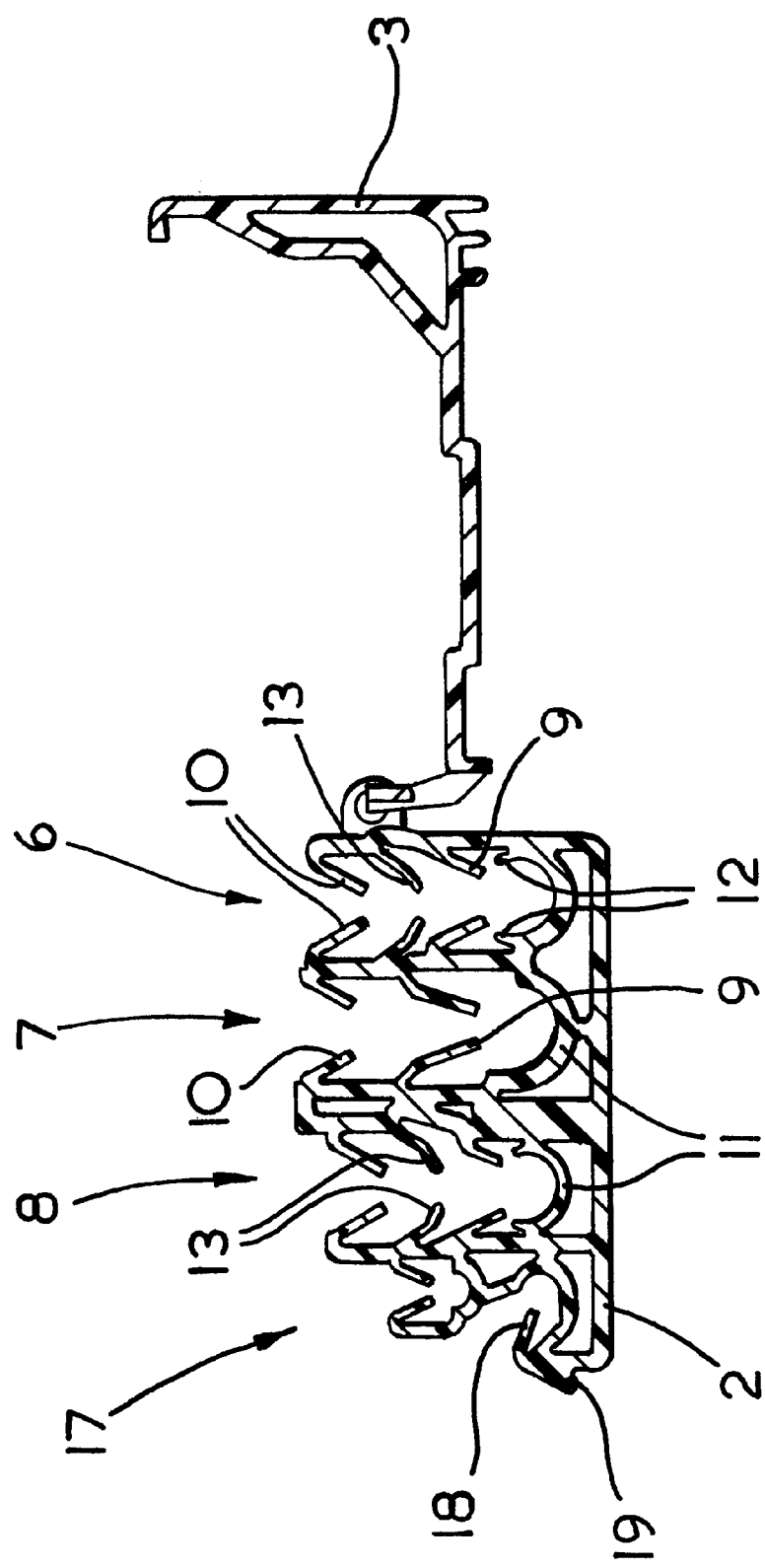
FIG. 2 is a different side elevational view, in section, taken along line C—C of FIG. 3, illustrating the line holder of the present invention.

In the lower plane $E_u$ the support element 2 has a flat or grooved base, preferably a concave receiving bowls 11 which approximately correspond to the diameters of the lines to be received. In the receiving regions 6 and 8 these receiving bowls 11 additionally have moulded-on clamping fingers or hooks 12 (see FIGS. 1 and 2) which are also elastically expandable, so the lines can be pushed into these receiving bowls 11 while creating an additional clamping effect.

Retaining limbs 13 (see FIGS. 1 and 2) are moulded on the side walls in the upper plane $E_o$ of the receiving regions 6 and 8. These retaining limbs 13 have a shape and alignment complementary to the line which can be received in the upper plane $E_o$, so this line comes to rest on the retaining limbs 13. As can be seen, these retaining limbs are arranged opposite one another in pairs within the receiving regions 6 and 8 and are also elastically expandable, so the line for the lower plane $E_u$ can be pushed through them.

The sealing clip 3 has meshing tongues 14, 15 moulded-on integrally and in pairs. As can be seen from FIG. 4, in the closed state of the line holder, these meshing tongues 14, 15 engage in the upper plane $E_o$ of the receiving regions 6 and 8. The meshing tongues 14 and 15 are designed in such a way that during this engagement they clamp and fix in a vibration-damping manner the lines received in the upper plane $E_o$ by the clamping limbs 10 and the retaining limbs 13.

Figure 3:
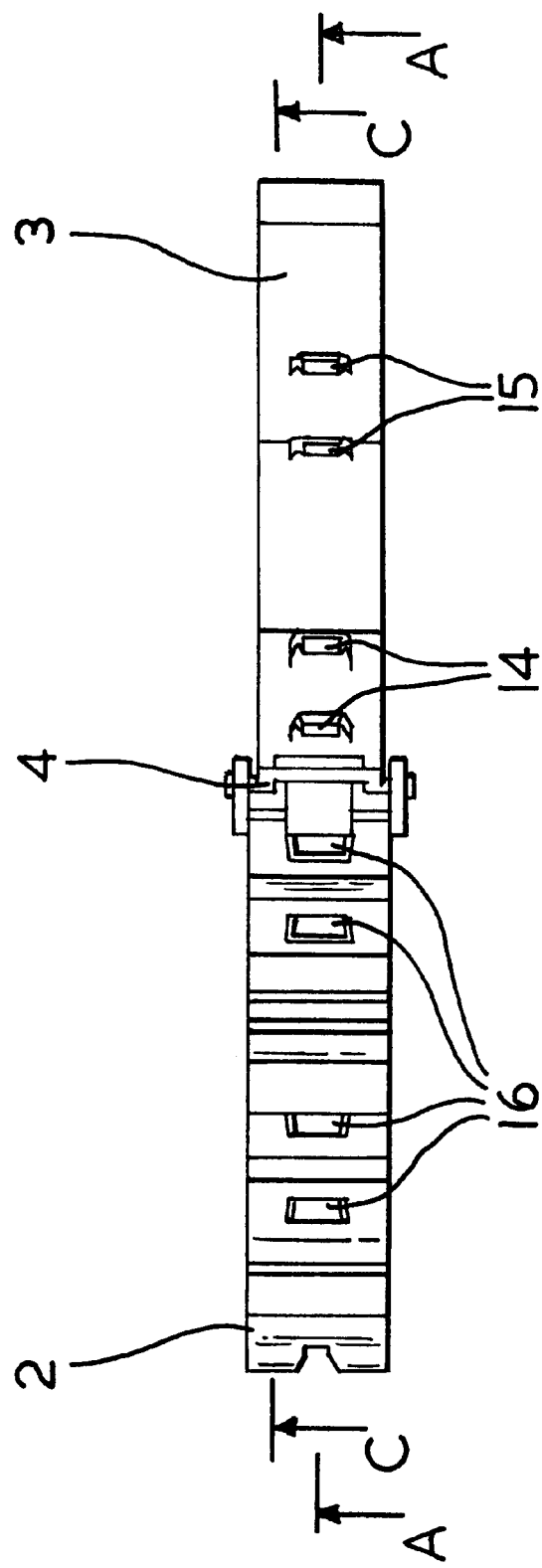
FIG. 3 is a top plan view of the line holder of the present invention without any lines and in the open state.

As can be seen in FIG. 3 and FIG. 4 these meshing tongues 14, 15 engage through apertures 16 correspondingly formed in the clamping limbs 10 and retaining limbs 13.

On the side remote from the joint 4 of the sealing clip 3 the support element 2 has a further receiving region 17 which is divided in two, the lower plane $E_u$ of this receiving region 17 being substantially accessible laterally, i.e. slightly obliquely. The lower plane $E_u$ of this receiving region 17 has a clamping limb 18 for fixing a line with a substantially smaller diameter.

On the side of the receiving region 17 a catch mechanism 19 (see FIGS. 1 and 2) is moulded-on which preferably allows releasable latching of the sealing clip 3 with the support element 2.

In general, the above identified embodiments are not to be construed as limiting the breadth of the present invention. It will be understood that modifications or other alternative constructions may become apparent within the scope of the invention as defined in the appended claims.

What is claimed is:

1. A line holder (1) connected to a car body for vibration-damped retention of lines in a motor vehicle comprising:

- a. a support element (2) to be secured to the car body;
- b. the support element (2) having at least one substantially U-shaped receiving region with at least two planes ($E_o$, $E_u$) to receive lines in each plane;
- c. a sealing clip (3) pivotably connected to the support element (2);
- d. the sealing clip (3) has pairs of meshing tongues (14, 15) moulded thereon to clampingly receive lines therein;
- e. the pair of meshing tongues (14, 15) of a predetermined diameter that is substantially equal to the diameter of the received line;
- f. pairs of clamping limbs (9, 10) are formed in each of the planes ($E_o$, $E_u$) of the support element (2) and adapted to be engaged with the received line;
- g. the clamping limbs (9, 10) to engage the received lines to clamp the same into the line holder to prevent accidental detachment therefrom;
- h. each of the clamping limbs (9, 10) permit the received line to be pushed through the clamping limbs (9, 10) in one plane ($E_o$) to be received in the other plane ($E_u$); i. a concave receiving bowl (11) is formed in the lower plane ($E_u$) of the support element (2);
- j. pairs of retaining limbs (13) are formed at the bottom of the upper plane ($E_o$) to engage and clamp the received line of equal diameter as the meshing tongue (14, 15) therein;
- k. the retaining limbs (13) have a predetermined diameter that is substantially equal to the diameter of the received line to be clamped in the upper plane ($E_o$);
- l. the retaining limbs (13) are elastically expandable, so the received line fitted in the lower plane ($E_u$) can be pushed through the retaining limbs (13) of the upper plane; and
- m. the retaining limbs (13) and the meshing tongues (14, 15) of the upper plane ($E_o$) coact to engage and clamp the received line in the upper plane ($E_o$).

2. The line holder claimed in claim 1 wherein:
- a. a pair of predetermined openings (16, 16) formed in superposition to each other in the upper and lower planes ($E_o$, $E_u$), with the opening in the upper plane ($E_o$) smaller than the opening in the lower plane ($E_u$).

3. The line holder claimed in claim 2 wherein:
- a. a clamping limb (18) formed on one side of the line holder remote from the receiving lines.

4. The line holder claimed in claim 3 wherein:
- a. a releasable catch mechanism (19) formed on the support element (2); and
- b. the mechanism (19) to engage in the closed state.

5. The line holder claimed in claim 4 wherein:
- a. the line holder (1) is formed of a resilient plastic material.

6. The combination claimed in claim 5 wherein:
- a. elastically expandable clamping fingers (12) are formed at the opposite upper ends of the receiving bowl (11).

7. A line holder (1) connected to a car body for vibration-damped retention of lines in a motor vehicle comprising:
- a. a support element (2) having a base to be secured to the car body;
- b. the support element (2) having at least one substantially U-shaped receiving region with at least two planes ($E_o$, $E_u$) to receive lines in each plane;
- c. a sealing clip (3) pivotably connected to the support element (2);
- d. the sealing clip (3) having pairs of meshing tongues (14, 15) moulded thereon to clampingly engage at least the lines in the upper plane ($E_o$) therein;
- e. the pair of meshing tongues (14, 15) of a predetermined diameter that is substantially equal to the diameter of the received line;
- f. pairs of clamping limbs (9, 10) are formed in each of the planes ($E_o$, $E_u$) of the support element (2) and adapted to be engaged with the received line;
- g. the clamping limbs (9, 10) to engage the tops of the received lines to clamp the same into the line holder to prevent accidental detachment therefrom;
- h. each of the clamping limbs (9, 10) permit the received line to be pushed through the clamping limbs (9, 10) in one plane ($E_o$) to be received in the other plane ($E_u$);
- i. pairs of retaining limbs (13) of substantially equal diameter as the meshing tongue (14, 15) are formed at the bottom of the upper plane ($E_o$) to engage the received line therein, and adapted to permit the received line disposed in the lower plane ($E_u$) to be removed therefrom; and
- j. the clamping limbs (10), the meshing tongues (14, 15) and the retaining limbs (13) to alternately engage the received line disposed in the upper plane ($E_o$) to clamp the same therein.

* * * * *